US012737035B2

(12) United States Patent
O'Sullivan

(10) Patent No.: US 12,737,035 B2
(45) Date of Patent: Sep. 15, 2026

(54) GYST TECHNOLOGY

(71) Applicant: Daniel O'Sullivan, Sugar Land, TX (US)

(72) Inventor: Daniel O'Sullivan, Sugar Land, TX (US)

( * ) Notice: Subject to any disclaimer, the term of this patent is extended or adjusted under 35 U.S.C. 154(b) by 0 days.

(21) Appl. No.: 17/178,836

(22) Filed: Feb. 18, 2021

(65) Prior Publication Data

US 2022/0197369 A1 Jun. 23, 2022

Related U.S. Application Data

(60) Provisional application No. 63/130,078, filed on Dec. 23, 2020.

(51) Int. Cl.
*G06F 3/01* (2006.01)
*G06N 20/00* (2019.01)

(52) U.S. Cl.
CPC .............. *G06F 3/011* (2013.01); *G06F 3/017* (2013.01); *G06N 20/00* (2019.01)

(58) Field of Classification Search
CPC ....................................................... G06F 3/011
USPC ..................................... 715/863, 706; 345/8
See application file for complete search history.

(56) References Cited

U.S. PATENT DOCUMENTS 9,424,861 B2 * 8/2016 Jerram .................. G06N 5/022
10,311,645 B1 * 6/2019 Ravindran ............ A61B 5/163
2014/0310595 A1 * 10/2014 Acharya ................ G06F 3/011 715/706
2016/0026253 A1 * 1/2016 Bradski ............... H04N 13/128 345/8
2017/0206064 A1 * 7/2017 Breazeal ................... G06F 8/36
2019/0287515 A1 * 9/2019 Li .......................... G06N 3/084
2020/0012916 A1 * 1/2020 Dolignon .................. G06F 3/16
2020/0103980 A1 * 4/2020 Katz ..................... G06F 3/0484
2020/0251111 A1 * 8/2020 Temkin ............... G06F 16/2423
2020/0360469 A1 * 11/2020 Wang ..................... A61K 38/12
2021/0160373 A1 * 5/2021 Mcgann ............... G06Q 30/015
2021/0326421 A1 * 10/2021 Khoury ................... G10L 17/08

FOREIGN PATENT DOCUMENTS

WO WO-2016011159 A1 * 1/2016 ............ B25J 9/1656
WO WO-2022020232 A1 * 1/2022 ......... G01N 33/6848

* cited by examiner

*Primary Examiner* — Ruay Ho

(57) ABSTRACT

The Gyst Interaction Driven User Interface (Gyst Technology) allows a Human-Computer Interaction System to measure the interaction skill and/or interaction behavior exhibited by a human user via input devices and to adjust the output to the output devices accordingly. The measurement of user performance with the Gyst Technology is a new and improved method over earlier technologies and accounts for the users interaction skill, the amount of time they dwell on particular content, their speed of response generation, accuracy of response generation and other factors, any or all of which can be used to personalize the user experience in real time. The purpose of Gyst Technology is to provide a user experience that is tailored to the skills, preferences, abilities, optimal interaction skill, and other personal attributes of the user and their environment automatically via a machine-learned process. This provides a more cost effective and improved experience for the user.

12 Claims, 2 Drawing Sheets

Figure 1

Figure 2:
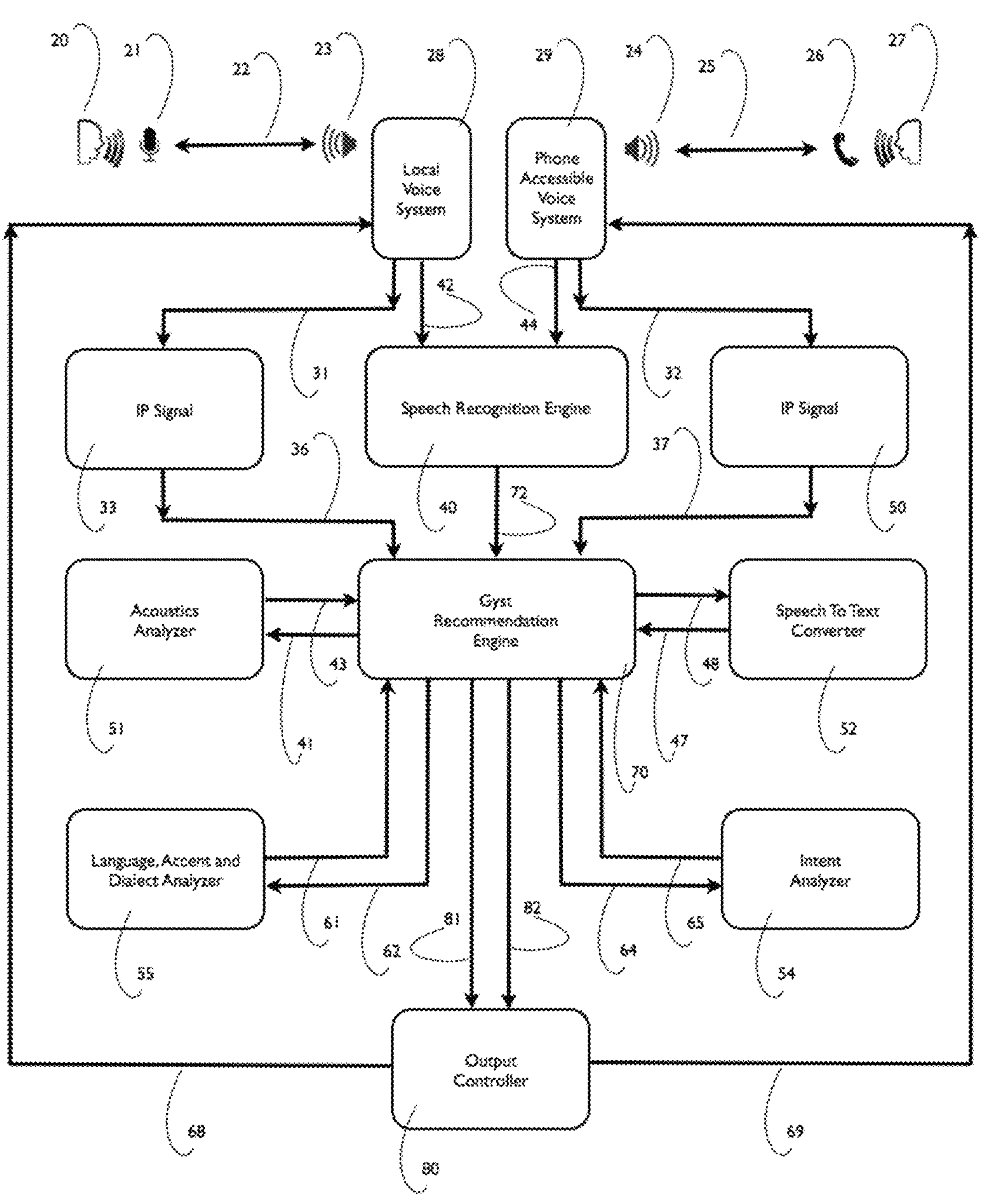

Monitor and measure any of (1) response time, (2) response accuracy, (3) speaking rate, (4) articulation rate, (5) speaking accent, (6) language, (7) dialect, (8) clarity of speech, (9) eye movement, (10) body language, (11) gesture characteristics, (12) physical movement and characteristics of moving a mouse, touch screen, track pad, keyboard keys, joystick, track ball or other input device, (13) TV remote control, (14) brain-computer interface signals, (15) virtual reality interface signals, (16) wearable technology and body sensors, (17) GPS interface signals, (18) facial expressions or (19) any characteristic associated with the signals generated via an input device by the user.

Analyze past and current state.
Compute next state.

Generate a response that is customer tailored to adjust any of (1) response time allowed, (2) content, (3) speaking rate, (4) articulation rate, (5) speaking accent, (6) language, (7) dialect, (8) clarity of speech, (9) gesture device characteristics, (10) characteristics of a mouse, touch screen, track pad, keyboard keys, joystick, track ball or other input device, (11) TV, mobile device or web viewing and audio content, (12) brain-computer interface output, (15) virtual reality output, (16) wearable technology and body sensor output, (17) GPS interface output, (18) facial expressions or (19) any characteristic associated with an output device.

GYST TECHNOLOGY

FIELD OF THE INVENTION

This invention pertains to processor-based systems requiring input and/or repeated interaction from a user. These systems and any software, methodologies, processes, peripheral devices and networks are known collectively as Human-Computer Interaction Systems or HCl Systems.

BACKGROUND OF THE INVENTION

Traditional HCl Systems are not adaptive in nature. These systems do not automatically sense the skill level and competency of the person using it or how much time a particular user dwells on content available via the HCl System and, as a consequence, they do not do anything useful for the user experience with that information. This leaves a lot of room for improvement in terms of human-machine productivity, efficiency, and usability.

Designers of existing Interactive Voice Response Systems (IVR Systems) for example, record all audio messages to be played to the caller at a single one-size-fits-all pace (words per minute rate). The IVR then plays each message in turn as the caller navigates the IVR Application Call Script. This results in IVR calls being "out of sync" with the natural conversational pace of most callers. This in turn results in a longer, less productive telephone call. Worse still, the caller is more likely to become frustrated with the IVR and opt to speak to a live agent. Since agent answered calls cost over 10 times more than automated calls on average, this presents both economic and resource problems for the service provider.

This same inefficiencies pervade many technologies including Intelligent Assistants, Auto, Home Automation and IoT systems, Virtual Reality, Gaming Technologies, Gesture Technologies, Brain-Computer Interaction, Television and Online video and content viewing, Audio, Podcast and Music listening and many other key technology areas.

BRIEF SUMMARY OF THE INVENTION

The Gyst Technology allows a Human-Computer Interaction System to measure the interaction skill and/or interaction behavior exhibited by a human user via input devices and to adjust the output to the output devices accordingly. The measurement of user performance with the Gyst Technology is a new and improved method over earlier technologies and accounts for the users interaction skill, the amount of time they dwell on particular content, their speed of response generation, accuracy of response generation and other factors, any or all of which can be used to personalize the user experience in real time.

The purpose of Gyst Technology is to provide a user experience that is tailored to the skills, preferences, abilities, optimal interaction skill, and other personal attributes of the user and their environment automatically. This provides an improved experience for the user that is also more productive and cost efficient and that can automatically optimize itself over time with repeated use.

DETAILED DESCRIPTION OF THE INVENTION

The principal improvement the Gyst Technology provides is the adjustment of the HCl System output in accordance with the actual interaction skill and preferences of the user. FIG. 1 shows how the Gyst Technology uses a continuous feedback loop to provide a much more engaging and custom-tailored experience for the user.

The Gyst Technology allows an HCl System to monitor behavior exhibited by a human user via responses generated by the supported input devices and to adjust output to the supported output devices accordingly. The purpose of the technology is to provide a user experience that is tailored to the skills, preferences, deficiencies, and other personal attributes of the user automatically. This in turn provides an improved user experience that is more productive and cost efficient and that can automatically optimize itself over time with repeated use.

The Gyst Technology implementation generally takes the form of software programs written in Java, C#, C++ or another programming language and running on computer hardware either locally, on a network, or in the cloud.

This code can run on electronic devices and services including IVR and Speech systems, servers, desktop computers and workstations, laptops, book readers, mobile phones and other mobile devices, personal electronics such as MP3 and music players, wearable computers, web servers, auto and vehicle computers, embedded devices and any machine that requires human interaction.

In the context of this document, Gyst Technology can refer to any of the above systems or an electronic service that provides functionality similar to that of the system. The software allows the electronic device to monitor and learn human behavior for a given user or group of users via the selections, content dwell duration, skill, accuracy and speed of their responses and to adjust the device output in such a way as to provide an improved experience for the user.

Referring now to FIG. 2, I show a Gyst Recommendation Engine (GRE) 70 at the heart of an HCl for audio information delivery. The HCl can be accessed by a local user 20 via a microphone 21 and local voice system 28. In addition, a remote user 27 can access the HCl via speech and touch-tone via a telephone 26 and a phone accessible voice system 29.

Audio is received at the speech recognition engine 40 via the Local Voice System (LVS) 28 at LVS link 42. Audio is received at the Speech Recognition Engine (SRE) 40 via the Phone Accessible Voice System (PAVS) 29 at PAVS link 44.

The speech recognition engine 40 segments this audio by breaking it up into words, phrases, syllables, phonemes and other recognizable audio segments according to its own internal grammar and other audio signal analysis, lexical and acoustical rules. The output of the SRE 40 is fed into the GRE 70 via the SRE link 72.

In addition, the interaction data from the LVS 28 is fed into the IP Signal processor 33 via the LVS data link 31. This LVS data link 31 consists of signals that indicate when the LVS 28 is speaking, when the local user 20 is speaking, when the LVS 28 is requesting input from the local user 20 and when the local user 20 has responded or failed to respond to the LVS 28. The interaction data as such is fed into the GRE 70 via the data link 36.

In addition, the interaction data from the PAVS 29 is fed into the IP Signal processor 50 via the LVS data link 32. This PAVS data link 32 consists of signals that indicate when the PAVS 29 is speaking, when the remote user 27 is speaking, when the PAVS 29 is requesting input from the remote user 27 and when the remote user 27 has responded or failed to respond to the PAVS 29. The interaction data as such is fed into the GRE 70 via the data link 37.

The GRE 70 is continually analyzing data streams representing interaction related data via data links 36 and 37. It measures the timing of such interactions, how long it takes between each event, what errors occur, when a timeout occurs etc. Errors occur when the local user 20 or remote user 27 do not respond in the allotted time to respond. Errors occur when the local user 20 or remote user 27 respond "out of grammar" or out of allowed scope within the conversation the LVS 28 is having with the local user 20 and the conversation the PAVS 29 is having with the remote user 27 respectively.

The GRE 70 is also continually analyzing word, phoneme, sentence, syllable, and other acoustic content from the SRE 40. As part of that analysis, the GRE 70 sends this acoustic content to the Speech To Text Converter (STTC) 52 via link 48 and receives back flat text, such as ASCII characters or other representational written data, via data link 47. The GRE 70 uses this text representation of the spoken words and utterances to determine characteristics of the spoken or acoustic version of the input speech stream. In this way, the GRE 70 can determine things like word count, syllable count, character count, sentence count, phoneme count and the like. The GRE 70 uses this text related data analysis, along with timing aspects associated with the interaction data described above and fed in via data links 36 and 37 to determine such important things as words per minute spoken, phonemes and syllables per minute spoken, happy words, sad words, anger or swear words, joyous words, words of user frustration and the like. It can also determine how long the user leaves in terms of pauses between sentences, which is very important in terms of conversational turn-taking and good voice user interface design. The GRE will use this turn-taking data to "know when to speak and know when to listen" as it adjusts the output of the Output Controller 80.

Further, this text analysis can be used to determine the speaking language used by the user and possibly even the local accent or regional dialect.

The GRE 70 also sends acoustical data to the Acoustics Analyzer 51 via link 41. The Acoustics Analyzer 51 further analyzes the analog audio signals to determine the emotional state of the user and report back to the GRE 70 via data link 43.

The GRE 70 also sends acoustical data to the Language, Accent, and Dialect Analyzer 55 via link 62. The Language, Accent and Dialect Analyzer 55 further analyzes the analog audio signals to determine the Language, Accent and Dialect of the user and report back to the GRE 70 via data link 61.

The GRE 70 also sends text data to the Intent Analyzer 54 via link 64. The Intent Analyzer 54 parses this textual input stream to determine what it is the user is trying to accomplish and reports this back to the GRE 70 via data link 65.

To summarize, the GRE 70 is constantly receiving streams of input from the SRE 40, IP Signal Processor 33 and IP Signal Processor 50 in real time as the conversation between the local user 20 and remote user 27 takes place between the LVS 28 and PAVS 29 respectively, feeding this data into the Acoustics Analyzer 51, Speech To Text Converter 52, Language, Accent and Dialect Analyzer 55 and Intent Analyzer 54, and constantly receiving back and analyzing data streams from these same sources to determine aspects about how the conversations with the local user 20 and remote user 27 are unfolding and progressing. This continuous, real time analysis allows the GRE 70 to output recommendations to the Output Controller 80 via data links 81 and 82. These output recommendations can take the form of directing the Output Controller 80 to change aspects of what the local user 20 and remote user 27 hear via the local speaker 23 and remote speaker 24 respectively. Said aspects can include, but not be limited to, changing the words per minute spoken, the emotional tone, the speaking volume, turn-taking synchronization, dialogue flow and audio content, spoken language, spoken accent, spoken dialect, speaking tone, time allowed to respond and other conversational aspects to promote harmonious conversation between the local user 20 and remote user 27 and the LVS 28 and PAVS 29 respectively. The GRE 70 makes these recommendations continuously and in real time throughout the conversations that are taking place between the local user 20 and the LVS 28 and the remote user 27 and the PAVS 29.

Further, though only a single local user 20 and single remote user 27 are shown in FIG. 2, many such users, or indeed a single local or single remote user could be supported via a single GRE implementation. The GRE can be a web or network supported service accessible via a protocol such as HTTP, or it can be embedded within a device such as an iPhone via software to support conversation optimization for a service like Siri. The same could of course be done for other Intelligent Assistants like Microsoft Cortana, Google Assistant, Amazon Alexa or for Internet of Things devices, Home Automation, Automobile and other web based or embedded devices.

Further, an Artificial Intelligence and Machine Learning service such as IBM Watson can be used in addition to and in like manner to the Acoustics Analyzer 51, Speech To Text Converter 52, Language, Accent and Dialect Analyzer 55 and Intent Analyzer 54 above to further understand the conversation taking place between the local user 20 and the LVS 28 and the remote user 27 and PAVS 29 in order to further promote harmonious conversation between the users and the respective voice systems in a similar manner.

Interaction Driven Visual Experience

A television supporting Gyst Technology automatically monitors the viewing habits of users over time and alters content selection options accordingly. The Gyst Technology monitors which specific channels, TV shows and audio/visual content the user selects over time and how long the user dwells on such content and channels. It then provides easy to use personalized search choices via the TV remote or on-screen instructions based on this Auto-Learned user behavior.

It is the dwell time here that makes this service particularly good at personalizing content and recommendations. Whether a user watches a show to completion or for just a few minutes says a lot about their desire for that type of content. The same is true if the show is paused and viewing is resumed at a later time—as opposed to the viewer electing to skip or erase that content after a period of viewing.

Content that may be on one channel but is similar in nature to previously selected content on a different channel can be presented to the viewer for selection. So a user that has had a demonstrated interest in for example, a particular baseball team, a type of sitcom or a particular news topic, would be automatically offered a direct option to view these and follow up shows on the same topic. Users in a household can uniquely identify themselves for the service so independent preference profiles can be used to tailor rapid content selection and notification for all users.

The service can be optioned to alert the user (via email, text messaging etc.) at those times when the TV is not in use as to when content they have shown a demonstrated interest in is available during the present or at a or future time. This also provides a great marketing opportunity for content providers while treating the user with personalized options they are likely to be interested in. The technology can also be optioned for automatic mode, where the user simply allows the Gyst Technology device to provide content based on Auto-Learned behavior over time.

The Gyst Technology technology here can be implemented via the Internet, the cloud or embedded in the television, the television remote control unit or as an option from the broadcast delivery service. Media transmission can be broadcast via cable, satellite, Internet, and other broadcast systems.

Gyst Technology technology is also a natural fit for desktop, laptop, and other forms of computers with standard input devices including a mouse, keyboard and microphone, speakers and a monitor. Some features include:

a. Changing visual content displayed based on the measured preferences of the user. For example, as a user navigates via pointing and clicking on desktop icons, the icons that are used most often are displayed larger and placed in more visually prominent and easily accessible area of the screen.

b. Providing Help Pop-Up Windows and Guidance when users with poor mouse/keyboard input navigation skills are detected. This could be a series of repetitive keyboard errors that occur over time or poor navigation skills via the pointing device. Highly targeted tutorials on how to improve the users skills in the affected areas can be offered.

c. Controlling screen and window transitions (fade, dissolve, brightness, etc.) based on Auto-Learned behavior. If a user points and click a mouse quickly and accurately, transitions are virtually instantaneous. If the user is slow, transitions and the types of transitions used are modulated accordingly. The visual rate of change, visual content and transition is matched and co-coordinated with what the software senses as the users abilities, skills and moods so as to produce a visual output that is more in tune with the user, promoting enhanced communication.

d. Modulate text with larger or smaller fonts with bolding, underline, color, or other text content or attributes used for emphasis based on the sensed skill of the user. Slower, less accurate users may have difficulty typing or poor eyesight (children or the handicapped and elderly population).

e. Allow an author's previous style and content to be tracked for later use in suggesting user-tailored templates for email and document generation. For example, when a user is writing to a particular contact, use an email template that reflects the formatting style and tone of previous email correspondence to this contact. This would include the same type of salutation (formal, informal etc.). For word-processed documents and letters, also include to addresses, date, subject line etc. If used previously.

In addition to TV shows or Music and Video behavior tracking, Web sites visited and the nature of the content viewed are tracked over time and offered again when the user request something similar. This is different than simple bookmarking and cookie collection. Web sites are tracked not just on the URL, but on the content type and topics the user previously navigated to. The amount of time the user navigates within a site (again, the dwell time), the site interaction and the frequency of navigation to that site factor into the preference rating for the site to a given user. Again, a marketing opportunity exists here for web site link placements and related product offers.

After a sufficient Auto-Learn period of use, the Gyst Technology technology can provide reports on typing and other input device navigation skills. Provide lessons and links to improve deficient skills (another marketing opportunity). Monitoring includes the monitoring of accuracy and input times of keystrokes, mouse clicks, specific input sequences and individual options, internet web sites visited, spelling and grammar inaccuracies, search topics selected and general overall user behavior.

Interaction Driven Audio Experience

This technology group includes Smartphones, Apple's iPhone and iPod, Android, MP3 Players, Pandora, Spotify, Apple Music, Apple Siri, Microsoft Cortana, Amazon Echo and Alexa, Google Assistant and Home and other means of delivering music, podcasts, news, information and other forms of audio content.

Audio and Video playlists, music genres and listening and viewing times during the day such as morning/evening commutes, evening relaxation, physical exercise and training schedules, study periods and so forth can be Auto-Learned and used to offer smart, personalized options for rapid selection to the user. This also offers a great marketing opportunity for music and video delivery systems like iTunes since intelligent, personalized suggestions can be offered to the user.

The technology can also be optioned for automatic mode, where the user simply allows the Gyst Technology device to provide content based on Auto-Learned behavior over time. This Gyst Technology implementation monitors which specific music, videos, web sites, and other audio/visual content the user selects over time and how long the user dwells on such content and media streams. It then provides search choices based on this previously learned user behavior. Content that may be on one source but is similar in nature to previously selected content from a different source can be presented to the viewer for selection. The service can be optioned to alert the user (via email, text messaging, alerts etc.) when content they have shown a demonstrated interest in is available during the present or at a future time.

The principles for the implementation of Gyst Technology technology for Radio Broadcast Services are very similar to those described earlier for the television set and personal electronics device implementations.

Music genres and listening times during the day such as morning/evening commutes, evening relaxation, physical exercise and training schedules, study periods and so forth can be Auto-Learned and used to offer smart, personalized options to users when listening to the radio on a regular basis. Content that may be on one radio channel but is similar in nature to previously selected content from a different channel can be presented to the viewer for easy selection.

This also offers a great marketing opportunity for artists, music publishers, and broadcast services. The service can be optioned to alert the user when content they have shown a demonstrated interest in is available during the present or at a future time.

Interaction Driven Gaming Experience

Auto Learning the skills of users while they interact with a video game reveals a great deal about their skills, personality, and gaming style. For example, with a Role Playing Game (RPG) such as the popular SOCOM war game series, a player that behaves very carefully and relies heavily on a defensive strategy will be profiled quite differently than one that is more aggressive and perhaps careless at times.

There are likely to be many different profiles that can be Auto-Learned over time as players sign in to the game and interact with the game strategy. This information can be used to personalize the gaming experience to suit the skill of the user. It can also give the gamer very detailed and individualized feedback and offer personalized lessons on how to improve their gaming skills, something most teenage gamers would like to achieve.

The same can be done for auto racing, flight simulator, air combat and other driving oriented games as the user maneuvers their vehicle through turns, on straight paths, deal with course obstacles and the like. Chess playing, checkers, crossword puzzles, and essentially electronic game can benefit from the Gyst Technology process in the same way.

Interaction Driven Gesture Experience

Auto-Learning the characteristics and skills of a user while they interact with a gesture technology reveals a great deal about their personality and interaction style.

By determining if a user gestures very rapidly, erratically, smoothly, deliberately or with an economy or excess of movement and range can give clues as to how to best optimize the user experience for that same user.

In a game where gestures are monitored in order to cause visual rendering, audio modulation, and/or physical movement such as vibration or mechanical momentum, a user demonstrating brief and erratic gestures can be treated one way, while a user demonstrating smooth and concise movement could be treated another. The same basic principle applies; the character of the user is demonstrated via their particular gesture style and this allows Gyst Technology to personalize the experience uniquely in order to provide the best experience for them.

Interaction Driven Virtual Reality Experience

Auto-Learning the characteristics and skills of a user while they interact with a virtual reality technology reveals a great deal about their personality and interaction style.

By determining if a user moves very rapidly, erratically, smoothly, deliberately or with an economy or excess of movement and range can give clues as to how to best optimize the user experience for that same user.

In a VR environment where the users physical movements (such as hand waving, walking, running, leaning or even eye movement) and other input related actions are monitored in order to cause scene changing, perspective orientation, visual rendering, audio modulation and/or physical movement such as vibration or mechanical momentum, a user demonstrating brief and erratic gestures can be treated one way, while a user demonstrating smooth and concise movement could be treated another.

The same basic principle applies; the character of the user is demonstrated via their particular actions within the VR world and this allows Gyst Technology to personalize the experience uniquely in order to provide the optimal experience for them.

Interaction Driven Brain-Computer Interface Experience

Auto-Learning the characteristics and skills of a user while they interact with BCI technology reveals a great deal about their personality and interaction style.

By determining if a user mentally reacts very rapidly, erratically, smoothly, deliberately or with an economy or excess of thought and clarity can give clues as to how to best optimize the user experience for that same user.

In an environment where any or all of the Gamma, Beta, Alpha, Theta and Delta brain waves of an individual are monitored in order to cause visual rendering, audio generation or modulation and/or physical movement such as vibration or mechanical momentum, a user demonstrating brief and erratic thought patterns can be treated one way, while a user demonstrating clear and deliberate thought patterns could be treated another.

The same basic principle applies; the character of the user is demonstrated via their particular thinking style and this allows Gyst Technology to personalize the experience uniquely in order to provide the best experience for them.

Interaction Driven Wearable Technology Experience

Gyst Technology technology in a timing device such as an alarm clock, wristwatch, or Personal Electronics Device (iPhone, Blackberry etc.) can help promote good sleep habits for users.

The user initially sets up a profile based on their age, gender, established sleep patterns, estimated sleep requirements, and willingness to improve their sleep. A keypad interface allows the user to indicate the time sleep was attempted, waking time, tracking users naps, weekend sleep schedule, mid-sleep wake-ups, and other exceptions. Notifications are transmitted via audible sound, email, pager alert, telephone call, or other means to communicate with a user.

If for example, a device like the iPhone is used as a personal alarm clock, waking times are automatically available to the software. This could be implemented as an iPhone application. GPS location information allows the Gyst Technology process here to automatically account for different time zones and travel patterns of the user.

Interaction Driven Gesture Experience

Interaction Driven Facial Expression Experience

Auto-Learning the characteristics and skills of a user while they interact with facial expression technology reveals a great deal about their personality and interaction style.

By determining if a user is happy or sad, tired or lively, angry or frustrated, engaged or indifferent can give clues as to how to best optimize the user experience for that same user.

The same basic principle applies; the character of the user is demonstrated via their facial expressions and this allows Gyst Technology to personalize the experience uniquely in order to provide the best experience for them.

Interaction Driven Travel Experience

Automobiles and PED's like the iPhone with built in GPS Navigation features provide another great opportunity to leverage the use of our Gyst Technology technology. In one example, Gyst Technology can Auto-Learn the driving habits of individuals as they commute to work, drop the kids at school, do the weekly errands, and so forth. AFICI software can track the GPS coordinates for trips made frequently over time and, using a service such as Google Maps, inform the driver when there is a shorter or faster alternative route available to their frequently traveled destinations. This is like finding a shortcut the driver never new existed between points they travel on a regular basis.

Besides the obvious time and money saving advantages this implementation has for the user, there are significant benefits and contributions to the current global initiative for a "greener" planet here due to fuel economy considerations. Imagine an iPhone owner simply downloading an application from Apple' App Store, installing the app so it runs in the background. Then receiving TripSaver alerts via the iPhone itself after a month or so of Auto-Learned behavior about short cuts they never knew existed on routes they take frequently.

The various features of novelty that characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

The invention is not limited by the embodiments described above which are presented as examples only but can be modified in various ways within the scope of protection defined by the patent claims. The invention also includes the aspects of the invention listed below:

1. A system, comprising:
   a processor-based system programmed to respond to a detectable input from a user during a period of time using a set of parameters to control the user experience in a known manner;
   the processor-based system being capable of measuring the response of the user as they respond at a known interaction point;
   the processor-based system being capable of adjusting the user experience in accordance with the response of the user as they respond at a known interaction point.
2. The system, wherein the set of parameters includes any of (1) a visual image, (2) a moving image, (3) image transitions, (4) an audio playback rate, (5) an audio message content, (6) the mechanical attributes of a physical device, (7) the positional attributes of a physical device, (8) the state of an output device and (9) an allowable user response timing parameter.
3. The system, wherein the measuring the response includes any of the users (1) response time, (2) response accuracy, (3) speaking rate, (4) articulation rate, (5) speaking accent, (6) language, (7) dialect, (8) clarity of speech, (9) eye movement, (10) body language, (11) gesture characteristics, (12) physical movement and characteristics of moving a mouse, touch screen, track pad, keyboard keys, joystick, track ball or other input device, (13) TV remote control, (14) brain-computer interface signals, (15) virtual reality interface signals, (16) wearable technology and body sensors, (17) GPS interface signals, (18) facial expressions or (19) any characteristic associated with the signals generated via an input device.
4. The system, wherein the measuring the response includes measuring how long the user dwells on any particular content or aspect of the user experience.
5. The system, wherein the measuring the response includes measuring the frequency with which the user experiences any particular content, or aspect of the user experience.
6. The system, wherein the measuring the response includes determining patterns associated with the user while responding to the user experience.
7. The system, wherein the adjusting the user experience includes adjusting any of the (1) response time allowed, (2) content, (3) speaking rate, (4) articulation rate, (5) speaking accent, (6) language, (7) dialect, (8) clarity of speech, (9) gesture device characteristics, (10) characteristics of a mouse, touch screen, track pad, keyboard keys, joystick, track ball or other input device, (11) TV, mobile device or web viewing and audio content, (12) brain-computer interface output, (15) virtual reality output, (16) wearable technology and body sensor output, (17) GPS interface output, (18) facial expressions or (19) any characteristic associated with an output device.
8. The system, wherein the measuring the response and adjusting the user experience are repeated for every interaction the user has during the entire user experience.
9. The system, wherein parameters for adjusting the user experience that are known to work for a particular user are stored and recalled for later use by the same user.
10. The system, wherein the user is a different user but exhibits similar response characteristics to that of another user or to that of a pre-programmed user profile.
11. The system, wherein the measuring the response and adjusting the user experience patterns are stored and analyzed over time in order to optimize the user experience based on time of day, day of week, month of year, seasonal and any time period exhibiting a meaningful pattern.
12. A non-transitory processor-readable medium storing code representing instructions to be executed by a processor, the code comprising code to cause the processor to:
   respond to a detectable input from a user during a period of time using a set of parameters to control the user experience in a known manner;
   measuring the response of the user as they respond at a known interaction point;
   adjusting the user experience in accordance with the response of the user as they respond at a known interaction point.
13. The non-transitory processor-readable medium, wherein the set of parameters includes any of (1) a visual image, (2) a moving image, (3) image transitions, (4) an audio playback rate, (5) an audio message content, (6) the mechanical attributes of a physical device, (7) the positional attributes of a physical device, (8) the state of an output device and (9) an allowable user response timing parameter.
14. The non-transitory processor-readable medium, wherein the measuring the response includes any of the users (1) response time, (2) response accuracy, (3) speaking rate, (4) articulation rate, (5) speaking accent, (6) language, (7) dialect, (8) clarity of speech, (9) eye movement, (10) body language, (11) gesture characteristics, (12) physical movement and characteristics of moving a mouse, touch screen, track pad, keyboard keys, joystick, track ball or other input device, (13) TV remote control, (14) brain-computer interface signals, (15) virtual reality interface signals, (16) wearable technology and body sensors, (17) GPS interface signals, (18) facial expressions or (19) any characteristic associated with the signals generated via an input device.
15. The non-transitory processor-readable medium, wherein the measuring the response includes measuring how long the user dwells on any particular content or aspect of the user experience.
16. The non-transitory processor-readable medium, wherein the measuring the response includes measuring the frequency with which the user experiences any particular content, or aspect of the user experience.
17. The non-transitory processor-readable medium, wherein the measuring the response includes determining patterns associated with the user while responding to the user experience.
18. The non-transitory processor-readable medium, wherein the adjusting the user experience includes adjusting any of the (1) response time allowed, (2) content, (3) speaking rate, (4) articulation rate, (5) speaking accent, (6) language, (7) dialect, (8) clarity of speech, (9) gesture device characteristics, (10) characteristics of a mouse, touch screen, track pad, keyboard keys, joystick, track ball or other input device, (11) TV, mobile device or web viewing and audio content, (12) brain-computer interface output, (15) virtual reality output, (16) wearable technology and body sensor output, (17) GPS interface output, (18) facial expressions or (19) any characteristic associated with an output device.

19. The non-transitory processor-readable medium, wherein the measuring the response and adjusting the user experience are repeated for every interaction the user has during the entire user experience.

20. The non-transitory processor-readable medium, wherein parameters for adjusting the user experience that are known to work for a particular user are stored and recalled for later use by the same user.

21. The non-transitory processor-readable medium, wherein the user is a different user but exhibits similar response characteristics to that of another user or to that of a pre-programmed user profile.

22. The non-transitory processor-readable medium, wherein the measuring the response and adjusting the user experience patterns are stored and analyzed over time in order to optimize the user experience based on time of day, day of week, month of year, seasonal and any time period exhibiting a meaningful pattern.

23. A Gyst Interaction Driven User Interface that allows an electronic system to monitor the skills, preferences, deficiencies, characteristics and behavior exhibited by a human user via responses generated by the supported input devices and to adjust output to the supported output devices accordingly.

24. A Gyst Interaction Driven User Interface, wherein said interface provides a user experience that is tailored to the skills, preferences, deficiencies, characteristics, behavior and other personal attributes of the user automatically via machine-learned processes.

25. A Gyst Interaction Driven User Interface that adjusts itself to promote harmonious audio or text displayed based conversation with the user, said adjustments to include but not be limited to considerations of the users speaking rate (words, syllables, phonemes, sentences, phrases per minute), articulation rate, speaking language, speaking dialect, speaking accent, conversational turn-taking parameters, likely theory of mind assumptions, emotional state such as anger, joy, frustration, distain, confusion, positivity, negativity and the like, sympathy, empathy, the users environment during the conversation, outside stimulus such as street noise, office distractions, mobile phone signals and phone noise, age, cognitive abilities, disabilities, hand-eye coordination, visual abilities and other similar considerations that a human would likely take into consideration if they were having the conversation with a human.

26. A Gyst Interaction Driven User Interface that uses a web API as described in an earlier section of this description in order to simply gather information about an existing voice applications weaknesses and strengths-thereby allowing a designer to make improvements in said voice application. Reports are generated showing where speech works best, where touch-tone works best, where most callers struggle and so forth.

I claim:

1. A Gyst Interaction Driven User Interface system comprising:

a server computing system configured to:

(a) expose a web application programming interface (web API) that is invocable by an existing voice application that conducts automated voice conversations with human callers;

(b) receive, via the web API and for multiple conversation turns of multiple calls handled by the existing voice application, conversation-turn data identifying, for each of a plurality of predefined interaction points in a call flow of the existing voice application and for a particular caller at a conversation turn corresponding to that interaction point, at least (i) a type of content presented to the caller and (ii) one or more user interaction metrics selected from response time, response accuracy, and a number of repetitions required for the caller to successfully respond;

(c) for each predefined interaction point, determine, using an AutoLearn process that analyzes historical conversation-turn data for the particular caller and for other callers having similar conversation patterns, a set of tuned user-experience parameters for that interaction point, the set of tuned user-experience parameters including at least:

(i) a selection between speech input and touch-tone input as a preferred modality for the conversation turn at that interaction point, (ii) an allowed response time for the caller to provide input at that conversation turn, and (iii) an audio playback rate for content presented at that conversation turn;

(d) for each conversation turn of a call at one of the predefined interaction points, return, via the web API and in response to an invocation by the existing voice application, a response message that includes the set of tuned user-experience parameters for that interaction point, the set specifying the modality selection, allowed response time, and audio playback rate for a next prompt to be output to the current caller during that conversation turn at that interaction point;

(e) store the conversation-turn data and the tuned user-experience parameters for multiple callers in a data store;

(f) generate, from the stored conversation-turn data, server-side reports that identify, for the existing voice application, where speech input works best, where touch-tone input works best, and where callers experience difficulty within the call flow; and (g) exchange the conversation-turn data, the tuned user-experience parameters, and the server-side reports with the existing voice application using JSON, text, XML, or another structured data format;

and a configuration user interface that enables a designer of the existing voice application to review the server-side reports and manually adjust the tuned user-experience parameters over time.

2. The system of claim 1, wherein the AutoLearn process is further configured to automatically update the tuned user-experience parameters over time based on patterns in the user interaction metrics for the particular caller, including at least patterns in response time, response accuracy, and repetition count at the conversation turn corresponding to the particular interaction point.

3. The system of claim 1, wherein the server computing system is further configured to assign callers to profile groups based on similarity in their conversation behavior across conversation turns, and to transfer tuned user-experience parameters learned for callers in a first profile group to callers in a second profile group having similar conversation behavior.

4. The system of claim 1, wherein the conversation-turn data further comprises environment information or device type information for the caller, and wherein the AutoLearn process varies the tuned user-experience parameters based at least in part on the environment information or the device type information.

5. The system of claim 1, wherein the configuration user interface displays visualizations of where speech input and touch-tone input work best within the call flow and provides controls that enable the designer to enable or disable particular conversation turns or parameter changes for the existing voice application.

6. The system of claim 1, wherein the user interaction metrics further comprise at least one additional speech-related metric selected from the group consisting of speaking rate, articulation rate, speaking accent, language, dialect, and clarity of speech.

7. The system of claim 1, wherein the set of tuned user-experience parameters further includes at least one additional speech output parameter selected from the group consisting of wording of the prompt content, speaking rate, articulation rate, speaking accent, language, dialect, and clarity of speech.

8. The system of claim 1, wherein the existing voice application is further configured to conduct open natural-language conversations with callers that are not limited to the predefined call flow, and wherein the web API is further configured to be invoked for conversation turns in the open natural-language conversations and to return, for those conversation turns, the tuned user-experience parameters in the same manner as for conversation turns that correspond to the predefined interaction points.

9. A Gyst Interaction Driven User Interface system comprising:

a computing system that is integrated with or accessible to an existing voice application that conducts automated voice conversations with human callers, the computing system being configured to:

(a) expose an application programming interface (API) or other invocation mechanism that is callable from the existing voice application for multiple conversation turns of multiple calls handled by the existing voice application, the API or other invocation mechanism being implemented as at least one of (i) a web API invoked over a network, (ii) a local inter-process API, or (iii) an in-process software module call within the existing voice application;

(b) receive, via the API or other invocation mechanism, conversation-turn data identifying, for each of a plurality of conversation turns of the calls and for a particular caller at each conversation turn, at least (i) a type of content presented to the caller and (ii) one or more user interaction metrics selected from response time, response accuracy, and a number of repetitions required for the caller to successfully respond;

(c) for a plurality of conversation turns, determine, using an AutoLearn process that analyzes historical conversation-turn data for the particular caller and for other callers having similar conversation patterns, a set of tuned user-experience parameters for each conversation turn, the set of tuned user-experience parameters including at least:

(i) a selection between speech input and touch-tone input as a preferred modality for the conversation turn, (ii) an allowed response time for the caller to provide input at the conversation turn, and (iii) an audio playback rate for content presented at the conversation turn;

(d) for each conversation turn, return to the existing voice application, via the API or other invocation mechanism and in response to a call from the existing voice application, a response message that includes the set of tuned user-experience parameters for that conversation turn, the set specifying the modality selection, allowed response time, and audio playback rate for a next prompt to be output to the current caller during that conversation turn;

(e) store the conversation-turn data and the tuned user-experience parameters for multiple callers in a data store;

(f) generate, from the stored conversation-turn data, reports that identify, for the existing voice application, where speech input works best, where touch-tone input works best, and where callers experience difficulty across conversation turns; and (g) exchange the conversation-turn data, the tuned user-experience parameters, and the reports with the existing voice application using JSON, text, XML, or another structured data format.

10. The system of claim 9, wherein the application programming interface or other invocation mechanism is implemented entirely within a software process of the existing voice application such that calls to the AutoLearn process and to the tuned user-experience parameters are made as local in-process function calls without use of a network.

11. The system of claim 9, wherein the user interaction metrics further comprise at least one additional speech-related metric selected from the group consisting of speaking rate, articulation rate, speaking accent, language, dialect, and clarity of speech.

12. The system of claim 9, wherein the set of tuned user-experience parameters further includes at least one additional speech output parameter selected from the group consisting of wording of the prompt content, speaking rate, articulation rate, speaking accent, language, dialect, and clarity of speech.

* * * * *